United States Patent [19]

Sato et al.

[11] 4,277,674
[45] Jul. 7, 1981

[54] TAPE RUNNING DIRECTION INDICATOR

[75] Inventors: Masanobu Sato; Ken Satoh; Toshihiro Nakao; Kenzi Furuta, all of Hachioji, Japan

[73] Assignee: Olympus Optical Co., Ltd., Tokyo, Japan

[21] Appl. No.: 936,689

[22] Filed: Aug. 25, 1978

[30] Foreign Application Priority Data

Sep. 30, 1977 [JP] Japan ................... 52-117560

[51] Int. Cl.³ .................. G06M 3/14; H03K 21/00
[52] U.S. Cl. .................. 235/92 EA; 235/92 EV; 340/82
[58] Field of Search ....... 235/92 MP, 92 DN, 92 EV, 235/92 EA, 92 CC, 103, 103.5 R, 104; 360/72.1, 72.3, 74.2, 90, 137; 242/191, 75.51; 340/82, 83, 309.4

[56] References Cited

U.S. PATENT DOCUMENTS

| | | | |
|---|---|---|---|
| 3,488,558 | 1/1970 | Grafton | 340/83 |
| 3,553,528 | 1/1971 | Somlyody | 340/83 |
| 3,729,621 | 4/1973 | Taisne | 235/92 EV |
| 3,982,107 | 9/1976 | Butler | 235/92 EV |
| 3,984,810 | 10/1976 | Hudson, Jr. | 340/82 |
| 4,140,896 | 2/1979 | Robertson | 235/92 EV |
| 4,150,282 | 4/1979 | Aoki et al. | 235/92 MP |
| 4,151,566 | 4/1979 | Ohrman | 360/72.1 |

Primary Examiner—Leo H. Boudreau

[57] ABSTRACT

A tape running direction indicator is provided with a sensor for producing a sense pulse corresponding to the rotation of a take-up reel, a ring counter clocked by the sense pulse, and a display unit which receives output pulses of the ring counter and includes decimal points arranged side by side for indication of the tape running direction. The output pulses of the ring counter are shifted corresponding to the direction of the tape running. A glint of each decimal point is successively shifted in the direction of the tape running while flashing.

15 Claims, 6 Drawing Figures

F I G. 2
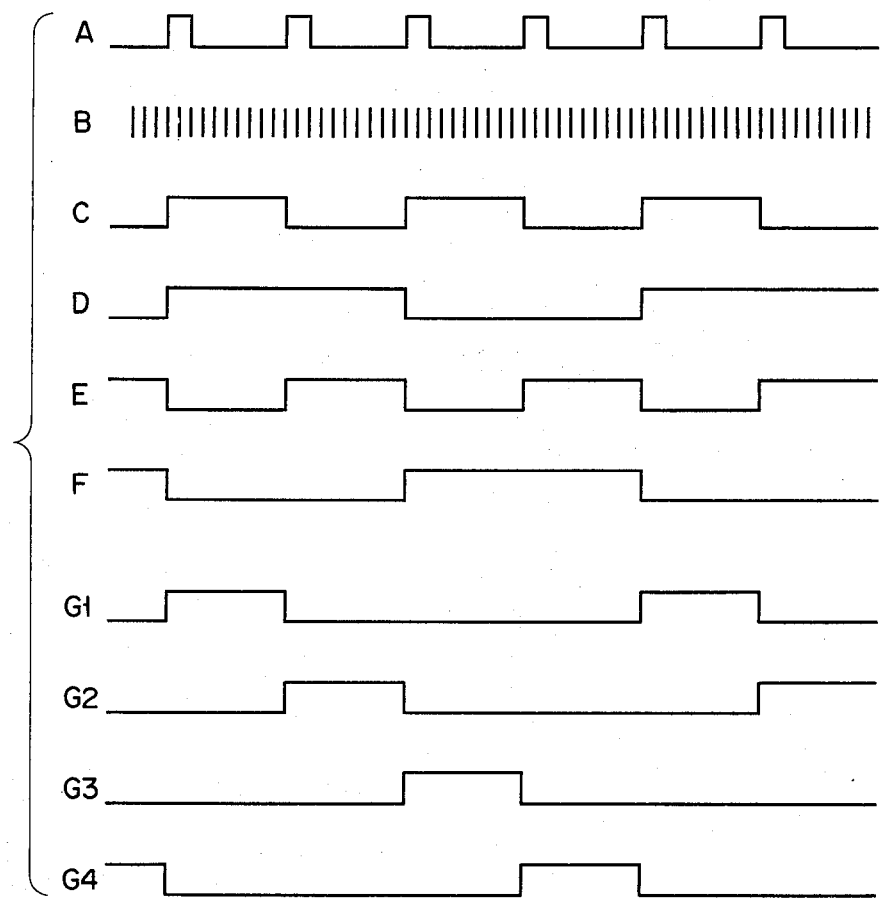

TAPE RUNNING DIRECTION INDICATOR

BACKGROUND OF THE INVENTION

The invention relates to a tape running direction indicator by using a character display unit for displaying the running amount of a tape used in a tape recorder.

Generally, in a cassette type tape recorder, a cassette half is fully housed in the tape recorder. For this, it is very difficult to catch the running direction of the tape being used, when the tape recorder used is provided with no tape running direction indicator.

For the indicator for tape running direction, there has been proposed an indicator in which the head of a tape take-up axis is marked or another indicator which is mechanically operable interlocking with the tape take-up axis.

In recent years, because of a remarkable improvement of digital electronic devices, we can easily and cheaply procure digital electronic parts such as digital display devices and counter ICs. This enables the digital display devices to be applied to counters to indicate the tape running amount of the tape recorder or indicators for indicating a voltage level of a battery. However, there has been no electronic display device capable of displaying both the tape running amount and the tape running direction by a single device.

SUMMARY OF THE INVENTION

Accordingly, an object of the invention is to provide a tape running direction indicator in which a tape running direction may be indicated by using a display unit already assembled for tape counter or other purposes.

To achieve the object of the invention, there is provided a tape running direction indicator comprising: display means in which a plurality of digit display sections are arranged side by side; running indication signal generating means for generating a signal corresponding to a running direction of a tape; and drive means for sequentially driving the respective digit display sections of the display means in accordance with the signal derived from the running indication signal generating means.

With such an arrangement, the running direction of a tape may be indicated by means of the display means provided for other purposes than the display of the tape running direction.

Other objects and features of the invention will be apparent from the following description taken in connection with the accompanying drawings, in which:

BRIEF DESCRIPTION OF THE DRAWINGS

FIG. 2 is a time chart useful in explaning the operation of the indicator shown in FIG. 1;

DESCRIPTION OF THE PREFERRED EMBODIMENTS

Reference is now made to FIGS. 1 to 5 for explaining preferred embodiments of the invention. Throughout the description in the specification, like reference symbols will be used to designate like or equivalent portions.

Figure 1:
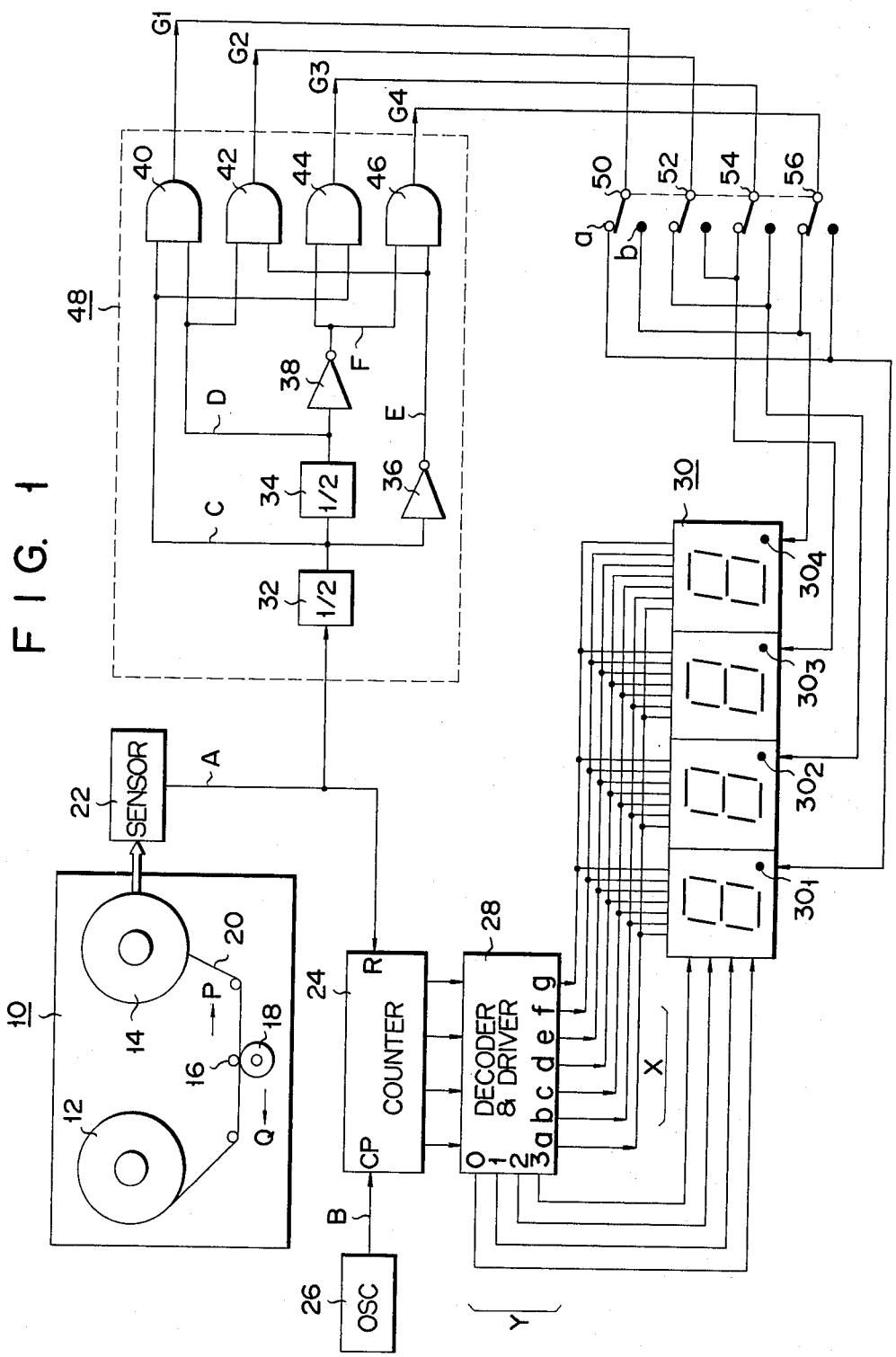
FIG. 1 shows a circuit diagram of an embodiment of a tape running direction indicator according to the invention in which the tape running direction is indicated through shifting of a glint.

Referring particularly to FIG. 1 illustrating a tape running direction indicator according to the invention, a tape transport 10 is provided with a supply reel 12, a take-up reel 14, a capstan 16 and a pinch roller 18. A recording tape 20 is driven by the capstan 16 and the pinch roller 18 in recording or playback operation, or the tape 20 is driven by a rotation mechanism at the supply reel 12 side or the take-up reel 14 side in rewinding or fast forward operation. A rotation sensor 22 is set at the take-up reel 14. The sensor 22 is a device for generating a signal depending on the rotation of the take-up reel 14 and operates as a running direction sensor. In this example, the sensor 22 generates one pulse once each revolution of the take-up reel 14.

A sensing signal A derived from the sensor 22 is applied to a reset input terminal R of a counter 24. The counter 24 produces count output signals which are expressed, for example, in BCD code of four digits. To a clock input terminal CP of the counter 24 is applied a clock signal B derived from a clock oscillator 26. The count output signal of the counter 24 is applied to a decoder/driver 28 where it is converted into a display signal X. The decoder/driver 28 further provides a switching signal Y for dynamic drive. The display signal X and the switching signal Y are supplied to a display unit 30 of four digits or four sections, for example.

The display unit 30 can display an amount of the tape running. By way of example, in the recording or playback, when the amount of tape reeled by the take-up reel 14 is little, the rotation speed of the take-up reel 14 is large and therefore, the period of the sensing signal A delivered from the sensor 22 is short. In other words, the period from the initiation of counting of the clock signal B by the counter 24 to the reset of it by the sensing signal A is short. Accordingly, the numeral displayed by the display unit 30 takes a small value. With increase of the tape running amount, the tape take-up amount of the take-up reel 14 increases while the rotation speed of the take-up reel 14 is progressively slower. Upon this, the period from the count initiation of the counter 24 to the reset of it is longer and therefore, the numeral on the display unit 30 becomes large. In this manner, the display unit 30 operates as a tape counter. The tape counter using the display unit 30 may also be constructed in the following manner. A pulse generator (22) is set on the take-up reel 14 of the tape transport 10, which pulse generator (22) generates a pulse (A) having information of the rotation speed and rotational direction of the take-up reel 14. More particularly, the pulse generator (22) is a sort of generator operating in such a manner that, when the tape 20 runs in a direction of arrow "P", it produces a positive pulse once each revolution of the take-up reel 14 while, when the tape runs in a reverse direction of arrow "Q", it produces a negative pulse once each revolution of the take-up reel 14. The positive and negative pulses generated by the pulse generator (22) are applied to the up-count and down-count inputs of a up/down counter (24), respectively. The count output of the up/down counter (24) is transferred to a 7-segment display section of the display unit 30, through the decoder/driver 28. In the tape counter thus constructed, when the tape 20 is transported in the "P" direction, the numeral on the display unit 30 becomes large as the take-up amount of tape 20 is increased. On the other hand, when the tape 20 travels in the "Q" direction, the numeral on the display unit 30 becomes small with decrease of the tape take-up amount of the take-up reel 14.

The decimal points on the display unit 30 which are usually not used may be utilized for indication of the tape running direction. The circuit to indicate the tape running direction by using the decimal points may be constructed in the following manner. The sensing signal A is applied to $\frac{1}{2}$ frequency dividers 32 and 34 connected in series where it is frequency-divided into $\frac{1}{2}$ and $\frac{1}{4}$, as shown by wave forms C and D in FIG. 2. The output signal, i.e. $\frac{1}{2}$ frequency-divided pulse C, of the frequency divider 32 is inverted by an inverter 36 into a pulse E corresponding to the antiphased pulse C. The output signal of the frequency divider 34, i.e. a $\frac{1}{4}$ frequency divided pulse D is inverted by an inverter 38 into a pulse F which corresponds to the antiphased pulse D. The pulses C and D are inputted into an AND gate 40 and the pulses D and E are inputted to an AND gate 42. The pulses C and F are supplied to an AND gate 44 and the pulses E and F to an AND gate 46. The output signals, i.e. running indication signals G1, G2, G3 and G4, of the AND gates 40, 42, 44 and 46 are logical-processed by the AND gates 40 to 46 to be timing pulses shifted one pulse, as shown by wave forms G1 to G4 in FIG. 2. The circuit components 32 to 46 constitute a running indication signal generating circuit 48 for indicating the tape running direction. The circuit 48 may be a kind of a ring counter.

The running indicating signals G1 to G4 are applied to the decimal points $30_1$ to $30_4$ of the display unit 30, through switches 50, 52, 54 and 56. These switches 50 to 56 are used to switch the running display operation in accordance with the tape running direction. The switches 50 to 56 are electrically or mechanically coupled with a first operation part for executing record/playback, fast forward and cue and a second operation part for executing rewind and reverse record/playback. For example, when the first operation part is operated, that is to say, the tape 20 is transported in the "P" direction, the contact points "a" of the switches 50 to 56 are selected so that the decimal points are sequentially activated in the order of $30_1$—$30_2$—$30_3$—$30_4$—$30_1$. On the other hand, when the second operation part is activated, that is to say, the tape 20 is fed in the "Q" direction, the contact points "b" of the switches 50 to 56 are selected so that the decimal points are similarly energized in the order of $30_4$—$30_3$—$30_2$—$30_1$—$30_4$.

In this manner, the glints of the decimal points $30_1$ to $30_4$ shift in the direction corresponding to the running direction of the tape 20. Therefore, the display unit 30 may be used as a tape running direction indicator as well as a tape counter. Thus, the indication of the tape running direction in this example is made through the shift of glints. The shifting rate of the glints corresponds to the rotation speed of the take-up reel 14.

Figure 3:
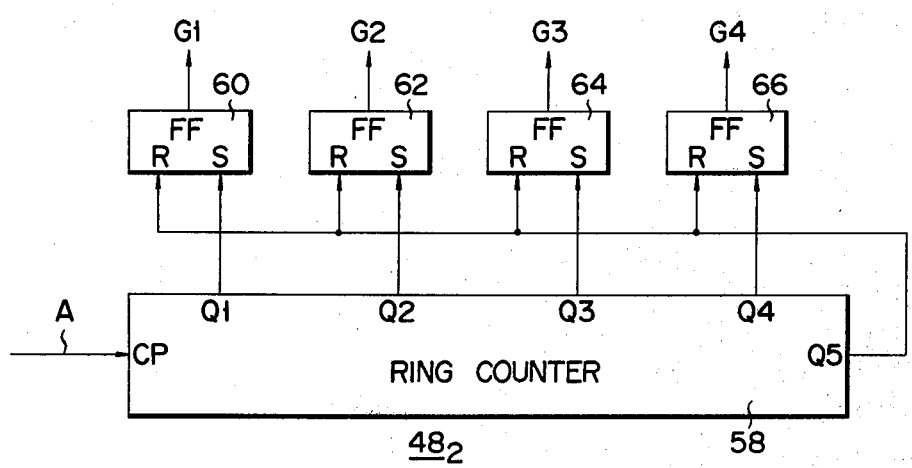
FIG. 3 shows a circuit diagram corresponding to the circuit 48 shown in FIG. 1 in which the tape running direction is indicated through change of a dotted line length.
Figure 4:
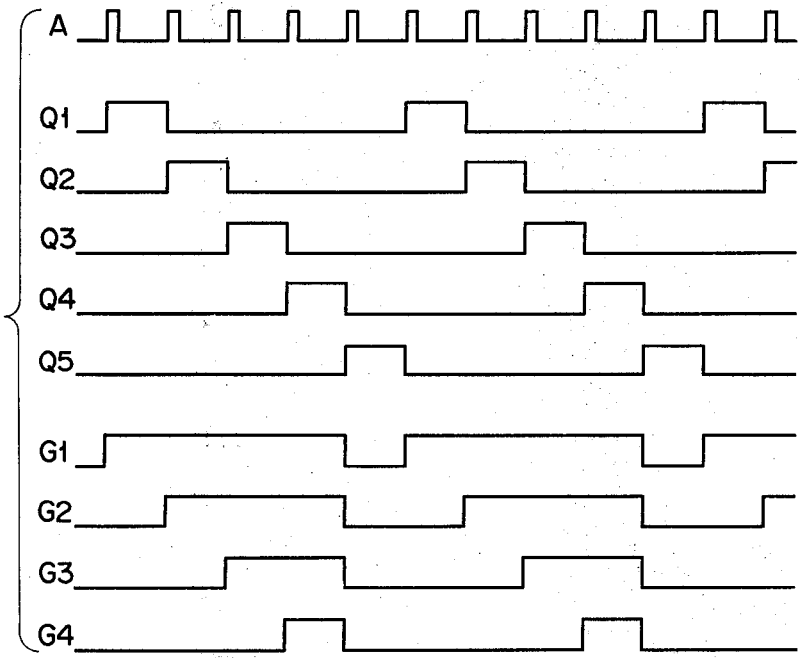
FIG. 4 shows a time chart for illustrating the operation of the circuit shown in FIG. 3.

FIG. 3 shows another example of the circuit for indicating the tape running direction by the display unit 30. As shown, the sensing signal A is applied as a clock pulse to a ring counter 58 of 5 bits. Output terminals Q1 to Q4 of the ring counter 58 are coupled with set input terminals of set/reset flip-flops 60 to 66, respectively, and an output terminal Q5 of the counter 58 is coupled with reset input terminals of the flip-flops 60 to 66. Pulse signals appearing at the output terminals Q1 to Q5 of the counter 58 are shifted each pulse of the sensing signal A as shown by wave forms A and Q1 to Q5 in FIG. 4. The flip-flops 60 to 66 are successively set by output pulses from the output terminals Q1 to Q4 of the counter 58 and are all reset by the output pulse of the output terminal Q5. The running indication signals G1 to G4 derived from the flip-flops 60 to 66 take wave shapes as G1 to G4 shown in FIG. 4.

When the decimal points $30_1$ to $30_4$ are driven by such running indicating signals G1 to G4, the glints of the decimal points $30_1$ to $30_4$ change in such a manner that the number of energized decimal points, i.e. glints, is increased in the tape running direction on the order of a dotted line. More precisely, the first pulse of the sensing signal A causes to light only the decimal point $30_1$. The second pulse leads to light the decimal points $30_1$ and $30_2$, the third pulse the decimal points $30_1$ to $30_3$ and the fourth pulse all the decimal points $30_1$ to $30_4$. The fifth pulse extinguishes all the decimal points $30_1$ to $30_4$. The pulses following the sixth pulses repeat the above operation. Change of the tape running direction indication may be made by the switches 50 to 56.

Figure 5:
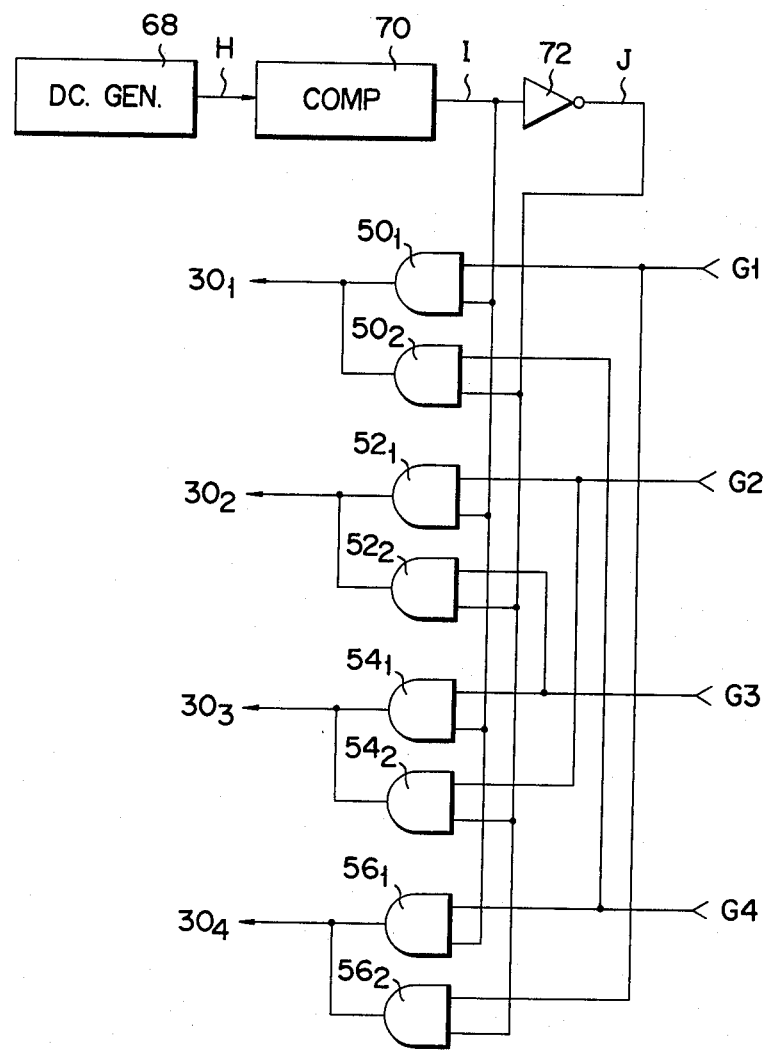
FIG. 5 shows a circuit diagram corresponding to the switches 50 to 56 shown in FIG. 1 in which the tape running direction indication is electronically changed in the display depending on the tape running direction in the tape transport 10.

In the examples in FIGS. 1 and 3, the switches 50 to 56 are switched corresponding to the operation of the tape transport 10. However, the switches 50 to 56 may also be operated depending on the rotational direction of the take-up reel 14 (or the supply reel 12). Assume now that a DC generator 68 is directly coupled with the axis of the take-up reel 14. As shown in FIG. 5, an output potential H of the generator 68 is positive or negative depending upon the rotational direction of the generator 68. The polarity of the potential H is judged by a comparator 70. In connection with the polarity judgement, the polarity is set up positive when the tape 20 runs in the "P" direction in the tape transport 10, and it is set up negative when the tape runs in the opposite direction, i.e. "Q" direction. An output gate signal I of the comparator 70 is at high level when the potential H is positive while it is at low level when the potential H is negative. The gate signal I is converted by an inverter 72 into a gate signal J which is the phaseinverted signal I.

The switches 50 to 56 may be substituted for the AND gates 50 to 56, respectively. In this case, the running indication signal G1 is applied to first input terminals of the AND gates $50_1$ and $56_2$. Similarly, the running indication signal G2 is applied to first input terminals of the AND gates $52_1$ and $54_2$; the signal G3 to first input terminals of the AND gates $54_1$ and $52_2$; the signal G4 to input terminals of the AND gates $56_1$ and $50_2$. The output signals of the AND gates $50_1+50_2$, $52_1+52_2$, $54_1+54_2$ and $56_1+56_2$ are transferred to the decimal points $30_1$, $30_2$, $30_3$ and $30_4$ of the display unit 30, respectively. The gate signal I is applied to second input terminals of the AND gates $50_1$, $52_1$, $54_1$ and $56_1$ and the gate signal J to second terminals of the AND gates $50_2$, $52_2$, $54_2$ and $56_2$.

In the operation of the thus constructed switch gate, when the tape 20 travels in the "P" direction in the tape transport 10, if the gate signal I is at high level, the AND gates $50_1$, $52_1$, $54_1$ and $56_1$ are enabled. At this time, the gate signal J is at low level so that the AND gates $50_2$, $52_2$, $54_2$ and $56_2$ are disabled. With this circuit connection, the running indication signals G1 to G4 are supplied to the decimal points $30_1$ to $30_4$, respectively. When the tape 20 travels in the "Q" direction, the AND gates $50_2$ to $56_2$ are enabled and the AND gates $50_1$ to $56_1$ are disabled. Accordingly, at this time, the running indication signals G1 to G4 are supplied to the decimal points $30_4$ to $30_1$, respectively.

The embodiments thus far described employ the decimal points in the diaplay unit 30 for the indication of the tape running direction. However, a part or all of the seven segments for numeral display in the display unit 30 may be used for the tape running direction indication. For example, the numerals displayed by the display unit 30 are flashed and the flashing of the numerals displayed are shifted corresponding to the tape running direction.

The signal to perform the tape running direction indication may be the clock signal B derived from the clock oscillator 26 in place of the sensing signal A from the rotation sensor 22. In this case, the counter 24 is used as a frequency counter. The running speed of the glint for the tape running direction indication in this case is independent of the running speed of the tape 20. In other words, the moving speed of the glint of the decimal point is kept constant irrespective of the speed of the tape running speed.

Figure 1A:
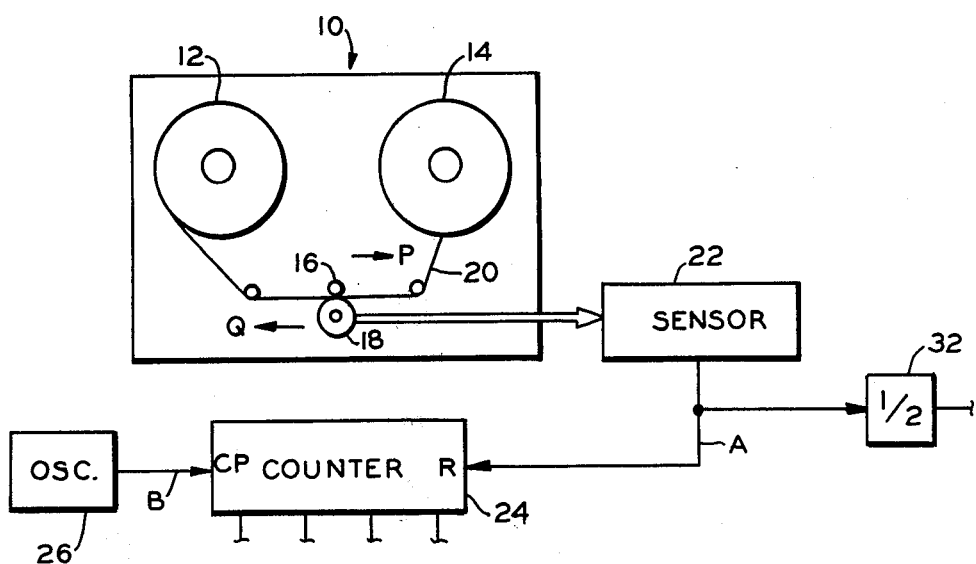
FIG. 1A shows a modification of part of FIG. 1.

Additionally, the rotation sensor 22 may be provided on the course of the tape running or at the supply reel 12. In the former case, a roller which rotates normally in contact with the tape 20 is provided in a proper place on the tape running course between the reels 12 and 14 and the sensor 22 is coupled with the roller. When the tape running direction indication is carried out only for the record/playback, the pinch roller 18 of the tape transport 10 may be used for the roller (as shown in FIG. 1A). In these cases, the glint running speed of the decimal points precisely corresponds to the tape running speed so that the display unit 30 includes the tape speed indication function, too.

The means for providing the sensing signal A corresponding to the tape running further includes the following devices, for example:

(1) a mechanical switch which is turned on or off corresponding to the rotation of the take-up reel 14.

(2) a photointerrupter in which an optical path is interrupted corresponding to the rotation of the take-up reel 14.

(3) a semiconductor hall element or a magnetic head to detect change of the magnetic field developed by a magnet which rotates in synchronism with the take-up reel 14.

Although specific circuit constructions have been illustrated and described herein, it is not intended that the invention be limited to the elements and circuit constructions disclosed. One skilled in the art will recognize that the particular elements or subcircuits may be used without departing from the scope and spirit of the invention.

What we claim is:

1. A tape running direction indicator comprising:
   a tape transport; a display means in which a plurality of digit display sections including display elements are arranged side by side;
   sensing means coupled to the tape transport for providing a sensing signal for making an indication corresponding to the tape running direction;
   running indication signal generating means operatively connected to said sensing means for sequentially providing running indication signals corresponding to the tape running direction on the basis of the sensing signal; and
   drive means for driving at least one display element included in each of the digit display sections in accordance with the running indication signals in order to make an indication corresponding to the tape running direction in the tape transport, the respective display elements being sequentially energized in accordance with the running indication signals which are shifted one by one in order that the energization of the display element is progressively shifted in a direction corresponding to the tape running direction.

2. A tape running direction indicator comprising:
   a tape transport display means in which a plurality of digit display sections including display elements are arranged side by side;
   sensing means coupled to the tape transport for providing a sensing signal for making an indication corresponding to the tape running direction;
   running indication signal generating means operatively connected to said sensing means for sequentially providing running indication signals corresponding to the tape running direction on the basis of the sensing signal; and
   drive means for driving at least one display element included in each of the digit display sections in accordance with the running indication signals in order to make an indication corresponding to the tape running direction in the tape transport, the respective display elements being accumulatively energized in accordance with the running indication signals, said signals having pulse widths which change for each pulse in such a way that the pulse widths are successively elongated in order that the energization of the display elements are progressively expanded in a direction corresponding to the tape running direction.

3. A tape running direction indicator according to claim 1, wherein said running indication signal generating means comprises a ring counter clocked each period of the sensing signal.

4. A tape running direction indicator according to claim 2, wherein said running indication signal generating means is comprised of a ring counter with output terminals of which the number is at least one larger than the number N of the digit display sections, and N set/reset flip-flops for providing N running indication signals to the respective digit display sections in which said flip-flops are sequentially set by the output pulse derived from the 1st to Nth output terminals of said ring counter and are all reset by the output pulse from the (N+1)th output terminal thereof.

5. A tape running direction indicator according to any one of claims 1 to 4, further comprising:
   switching means for changing the tape running indication signals corresponding to the energizing order of the display elements in accordance with the tape running direction, in order to change the directional indication of the tape running.

6. A tape running direction indicator according to any one of claims 1 to 4, wherein said display means partly serves as a tape counter for indicating the amount of tape running and a decimal point in each of the digit display sections is used for the display element for indicating the tape running direction.

7. A tape running direction indicator according to any one of claims 1 to 4, wherein said sensing signal has a period corresponding to the tape running speed in order that the energization of the display elements is performed at a rate corresponding to the tape running speed.

8. A tape running direction indicator according to any one of claims 1 to 4, wherein said sensing signal has a period corresponding to the rotational speed of a tape reel in order that the energization of the display elements is performed at a rate corresponding to the amount of the tape reeled by the tape reel.

9. A tape running direction indicator according to any one of claims 1 to 4, wherein said sensing means comprises a clock oscillator for generating an electrical signal with a fixed period as the sensing signal.

10. A tape running direction indicator according to claim 5, wherein said switching means comprises a switch with a plurality of contacts which is switched interlocking with mechanism in a tape transport.

11. A tape running direction indicator according to claim 5, wherein said switching means comprises a gate circuit controlled by an electrical signal changing corresponding to the tape running direction.

12. A tape running direction indicator according to claim 7, wherein said sensing means comprises a switch element turned on and off interlocking with a roller rotating in contact with the tape.

13. A tape running direction indicator according to claim 7, wherein said sensing means comprises a generator element coupled with a roller rotating in contact with the tape.

14. A tape running direction indicator according to claim 8, wherein said sensing means comprises a switch element turned on and off interlocking with the tape reel.

15. A tape running direction indicator according to claim 8, wherein said sensing means comprises a generator element coupled with an axis of the tape reel.

* * * * *